N. B. WALES.
LIQUID LEVEL INDICATOR.
APPLICATION FILED JUNE 5, 1917.
1,261,657.
Patented Apr. 2, 1918.
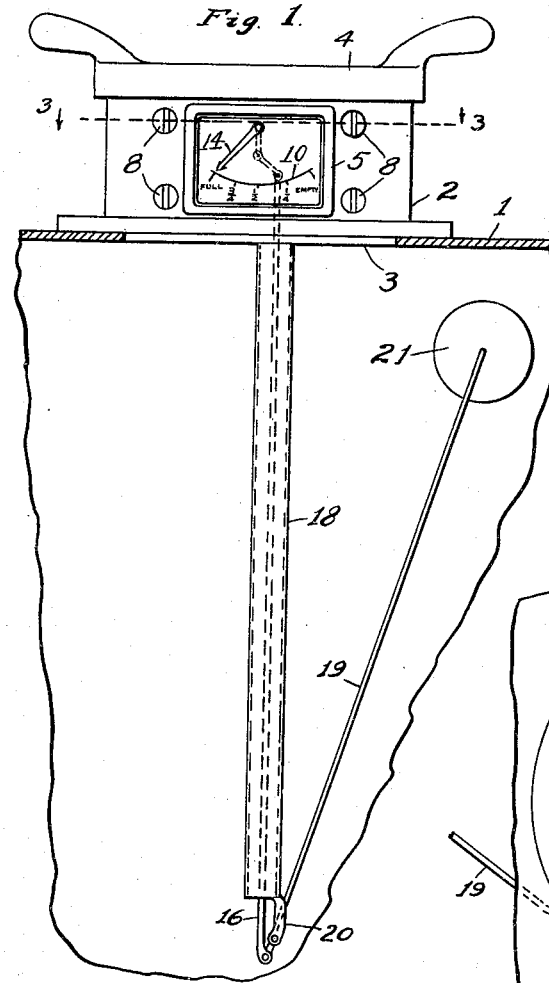
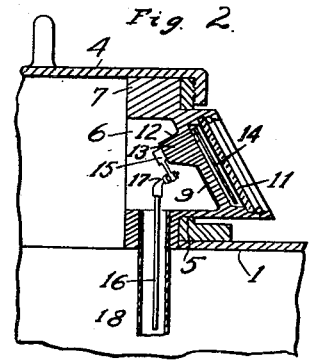
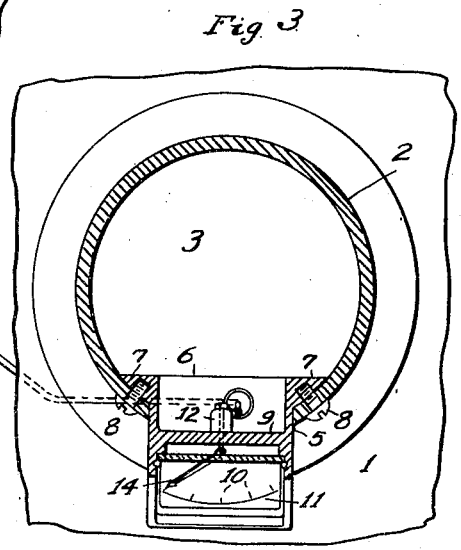
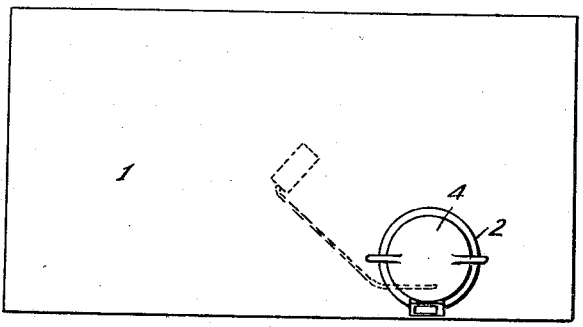
INVENTOR
Nathaniel B. Wales.
BY
B. P. Wheeler
ATTORNEY

UNITED STATES PATENT OFFICE.

NATHANIEL B. WALES, OF DETROIT, MICHIGAN, ASSIGNOR TO WILLIAM R. PIERCE, OF DETROIT, MICHIGAN.

LIQUID-LEVEL INDICATOR.

1,261,657.      Specification of Letters Patent.      Patented Apr. 2, 1918.

Application filed June 5, 1917. Serial No. 172,959.

*To all whom it may concern:*

Be it known that I, NATHANIEL B. WALES, a citizen of the United States, residing at Detroit, in the county of Wayne and State of Michigan, have invented a new and useful Liquid-Level Indicator, of which the following is a specification.

This invention relates to indicators or gages for registering the liquid level in containers, especially such as are employed for storing the liquid fuel supply for use on motor vehicles, and it consists in the novel construction and arrangement of parts as hereinafter set forth and claimed.

The principal object of the invention is to provide a serviceable and reliable gage of comparatively simple and inexpensive construction which may be inserted and operably mounted within the collar of the filling opening of the container so as to permit the free passage of the liquid therethrough in filling the container, and which will remain fixed therein in operative position to accurately register and visibly indicate at all times variations in the level of the contents of the container.

Further objects and advantages will appear from the following description of the device in connection with the accompanying drawings, in which a preferred structural embodiment of the essential features of the invention is illustrated, and in which, Figure 1 is a sectional elevation of a portion of a container or tank showing the gage, as in the present invention, mounted within the flanged collar of the filling opening of the container in position for operation.

Fig. 2 is a central vertical section through a portion of the container and filling opening with the gage in position therein, as in Fig. 1.

Fig. 3 is a horizontal section through the gage and collar of the filling opening of the container on dotted line 3—3 of Fig. 1.

Fig. 4 is a plan view of the container with gage therein and indicating by dotted lines the float lever with float positioned to operate centrally within the container.

Referring to the parts in the drawings by the corresponding characters of reference marked thereon, 1 represents a liquid supply or storage tank having a laterally projecting flanged sleeve or collar 2 secured to extend around an inlet or filling opening 3 formed in the upper wall thereof and this opening is closed by a winged cap 4 having screw-threaded engagement with the outer end of said collar.

Formed through the periphery of said collar, between the flanged base and closing cap thereof, is a rectangular opening 5 and inserted to project laterally through this opening from within the opening 3 is a hollow angular fitting 6 forming a supporting base for the gage mechanism. (See Figs. 2 and 3.) The inner portion of this base is provided upon opposite sides with arcuate lugs 7 which conform to and are drawn into contact with the inner arc of the wall of the collar 2 by screws 8, as shown in Figs. 1 and 3. Extending transversely through the hollow base 6 is an inclined partition 9 having inscribed on the outer face spaced horizontally in the arc of a circle thereon legends and characters 10 indicating varying stages of the liquid level in the container in the manner of a dial, and mounted adjacent the face of this dial in the open outer end of the base is a transparent inclosing plate 11 forming a sight window through which the indicia of the dial may be read. Projecting laterally and centrally from the upper inner face of the partition 9 is a bearing boss 12 and journaled to extend through said boss and partition at right angles to the outer face thereof is a pivot pin 13 upon the outer end of which an index arm 14 is mounted to swing therewith in the arc of a circle to register with the indicia of the face of the dial. The inner end of the pin 13 has fixed thereon a crank arm 15, and to the swinging end of this crank arm a vertically movable connecting rod 16 is pivotally attached by means of an ordinary ball and socket joint as at 17, or any suitable flexible coupling which will permit of relative angular movement of the connected parts. The rod 16 is freely embraced by a tube 18 which is anchored at one end in the base 6 to depend therefrom into the container. Pivotally connected at one end to the lower end of this rod is a float lever 19 which is fulcrumed near its connected end to swing on a bearing extension 20 of the tube 18, and mounted on the free end of this lever is a float 21 adapted to ride on the surface of the liquid to rise and fall therewith for imparting movement to the connecting rod to swing the index arm and register it with the indicia of the dial representing the corresponding stages in the liquid level of the container.

From the foregoing description of the construction and operation of the device it will be apparent that a simple, practical and efficient gage is produced which may be compactly assembled and readily mounted within the filling opening of the container in position to be conveniently readable exteriorly thereof and to remain operative therein to accurately indicate the variations in the liquid level without affecting the free use of the opening in the usual way for filling the container.

It is obvious that minor changes may be made in the structural details without departing from the essential features of the invention which is presented herewith as including all such changes and modifications as properly come within the scope and meaning of the appended claims.

I claim:

1. In combination with a liquid container having a filling opening provided with a surrounding collar, a hollow base mounted within said collar, said base having a sight window opening through the wall of said collar, a dial in said window having indicia thereon, and float controlled means supported by said base and carrying an indicator movable with the rise and fall of the liquid in said container to register with the indicia of said dial.

2. In combination with a liquid container having a filling opening provided with an extended collar, a hollow base mounted in said collar and having a sight window opening laterally through the wall thereof, a dial in said base having indicia thereon displayed through said window, a stem journaled through said dial and carrying an index arm registrable with the indicia thereof, a crank arm on said stem, a connecting rod flexibly coupled to said crank arm and extended into said container, a tubular extension on said base freely embracing said connecting rod, and a float controlled lever pivoted to said connecting rod and fulcrumed to swing on said tubular extension.

In testimony whereof I sign this specification.

NATHANIEL B. WALES.

Copies of this patent may be obtained for five cents each, by addressing the "Commissioner of Patents, Washington, D. C."